(12) United States Patent
Ahmed et al.

(10) Patent No.: US 12,244,148 B2
(45) Date of Patent: Mar. 4, 2025

(54) LOAD SHARING FOR MULTIPLE AUXILIARY LOW VOLTAGE BUSES OF VEHICLES

(71) Applicant: GM Global Technology Operations LLC, Detroit, MI (US)

(72) Inventors: Mohamed Ahmed Kamel Ahmed, Birmingham, MI (US); Robert A. De Stefano, Macomb Township, MI (US); Jun-mo Kang, Ann Arbor, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 43 days.

(21) Appl. No.: 18/170,220

(22) Filed: Feb. 16, 2023

(65) Prior Publication Data

US 2024/0283247 A1  Aug. 22, 2024

(51) Int. Cl.
| | | |
|---|---|---|
| *H02J 3/14* | (2006.01) | |
| *B60R 16/033* | (2006.01) | |
| *H02J 1/00* | (2006.01) | |
| *H02J 1/14* | (2006.01) | |

(52) U.S. Cl.
CPC .............. *H02J 3/14* (2013.01); *B60R 16/033* (2013.01); *H02J 1/00* (2013.01); *H02J 1/14* (2013.01); *H02J 2310/48* (2020.01)

(58) Field of Classification Search
CPC .................................. H02J 1/00; B60R 16/033
See application file for complete search history.

(56) References Cited

U.S. PATENT DOCUMENTS

| | | | | |
|---|---|---|---|---|
| 8,749,193 | B1* | 6/2014 | Sullivan | H02J 1/08 307/10.7 |
| 11,441,528 | B2* | 9/2022 | Ando | F02N 11/0866 |
| 11,978,913 | B2* | 5/2024 | Yang | H01M 50/20 |
| 2001/0004205 | A1* | 6/2001 | Miller | H02M 3/1582 323/224 |
| 2002/0140397 | A1* | 10/2002 | Hasegawa | H02J 7/1423 320/104 |
| 2004/0124709 | A1* | 7/2004 | Eisenberger | H02J 9/061 307/29 |
| 2012/0074901 | A1* | 3/2012 | Mohammed | B60L 53/11 320/109 |
| 2017/0106899 | A1* | 4/2017 | Xu | B60L 1/003 |
| 2017/0158058 | A1* | 6/2017 | Lee | H02J 7/00304 |
| 2020/0086814 | A1* | 3/2020 | Kageyama | H02H 7/18 |
| 2021/0009007 | A1* | 1/2021 | Day | B60L 58/22 |
| 2021/0343993 | A1* | 11/2021 | Yang | H02J 1/084 |
| 2022/0009376 | A1* | 1/2022 | Kawai | B60L 50/66 |
| 2022/0274488 | A1* | 9/2022 | Spjuth | B60L 58/20 |

(Continued)

*Primary Examiner* — Adi Amrany
(74) *Attorney, Agent, or Firm* — CANTOR COLBURN LLP

(57) ABSTRACT

Examples described herein provide a method that includes providing a first electric power pathway from a battery to a first auxiliary low voltage bus via a direct-current (DC)/DC converter and a first switch. The method further includes providing a second electric power pathway from the battery to a second auxiliary low voltage bus via the DC/DC converter and a second switch. The method further includes selectively controlling at least one of the first switch or the second switch to manage a load in one of the first auxiliary low voltage bus or the second auxiliary low voltage bus based at least in part on the battery or the load.

20 Claims, 12 Drawing Sheets

(56) References Cited

U.S. PATENT DOCUMENTS

| | | | |
|---|---|---|---|
| 2023/0057202 A1* | 2/2023 | Cirillo | B60L 1/12 |
| 2024/0006995 A1* | 1/2024 | Jheng | G06F 1/26 |
| 2024/0128770 A1* | 4/2024 | Zhou | H02J 7/0013 |

* cited by examiner

LOAD SHARING FOR MULTIPLE AUXILIARY LOW VOLTAGE BUSES OF VEHICLES

INTRODUCTION

Embodiments described herein generally relate to vehicles, and more specifically, to load sharing for multiple auxiliary low voltage buses of vehicles.

Modern vehicles (e.g., a car, a motorcycle, a boat, or any other type of automobile) may be equipped with one or more batteries and/or generators to provide electric power to electrical loads. Examples of electrical loads include electric motors, lights, infotainment equipment, electronic control units, climate control systems, and/or the like, including combinations and/or multiples thereof. The electrical loads can be connected to the one or more batteries and/or generators via a wiring harness.

SUMMARY

In one exemplary embodiment, a method is provided. The method includes providing a first electric power pathway from a battery to a first auxiliary low voltage bus via a direct-current (DC)/DC converter and a first switch. The method further includes providing a second electric power pathway from the battery to a second auxiliary low voltage bus via the DC/DC converter and a second switch. The method further includes selectively controlling at least one of the first switch or the second switch to manage a load in one of the first auxiliary low voltage bus or the second auxiliary low voltage bus based at least in part on the battery or the load.

In addition to one or more of the features described herein, or as an alternative, further embodiments of the method may include that the first switch and the second switch are solid state switches.

In addition to one or more of the features described herein, or as an alternative, further embodiments of the method may include that the first switch and the second switch are unidirectional switches.

In addition to one or more of the features described herein, or as an alternative, further embodiments of the method may include that the first switch and the second switch are bidirectional switches.

In addition to one or more of the features described herein, or as an alternative, further embodiments of the method may include that the selectively controlling is performed by one of the DC/DC converter, a low voltage bus controller, or a system controller.

In addition to one or more of the features described herein, or as an alternative, further embodiments of the method may include that selectively controlling based at least in part on the battery comprises selectively controlling based at least in part on a state of the battery.

In addition to one or more of the features described herein, or as an alternative, further embodiments of the method may include that selectively controlling based at least in part on the battery comprises selectively controlling based at least in part on a power consumption at the first auxiliary low voltage bus or the second auxiliary low voltage bus.

In addition to one or more of the features described herein, or as an alternative, further embodiments of the method may include that selectively controlling the at least one of the first switch or the second switch comprises enabling at least one of the first switch or the second switch.

In addition to one or more of the features described herein, or as an alternative, further embodiments of the method may include that the at least one of the first switch or the second switch is enabled for a period of time longer than a settling time of an output voltage or current of the DC/DC converter.

In addition to one or more of the features described herein, or as an alternative, further embodiments of the method may include that the at least one of the first switch or the second switch is enabled for a period of time shorter than a settling time of an output voltage or current of the DC/DC converter.

In addition to one or more of the features described herein, or as an alternative, further embodiments of the method may include that selectively controlling the at least one of the first switch or the second switch comprises disabling at least one of the first switch or the second switch.

In addition to one or more of the features described herein, or as an alternative, further embodiments of the method may include that the at least one of the first switch or the second switch is disabled for a period of time longer than a settling time of an output voltage or current of the DC/DC converter.

In addition to one or more of the features described herein, or as an alternative, further embodiments of the method may include that the at least one of the first switch or the second switch is disabled for a period of time shorter than a settling time of an output voltage or current of the DC/DC converter.

In addition to one or more of the features described herein, or as an alternative, further embodiments of the method may include that the first switch and the second switch circulate electric power between the first auxiliary low voltage bus and the second auxiliary low voltage bus during transients.

In another exemplary embodiment a system for load sharing for multiple auxiliary low voltage buses of a vehicle is provided. The system includes a battery providing a first electric power pathway from a battery to a first auxiliary low voltage bus via a direct-current (DC)/DC converter and a first switch and providing a second electric power pathway from the battery to a second auxiliary low voltage bus via the DC/DC converter and a second switch. The system further includes a controller configured to selectively control at least one of the first switch or the second switch to manage a load in one of the first auxiliary low voltage bus or the second auxiliary low voltage bus based at least in part on the battery or the load.

In addition to one or more of the features described herein, or as an alternative, further embodiments of the system may include that the first switch and the second switch are solid state switches.

In addition to one or more of the features described herein, or as an alternative, further embodiments of the system may include that the first switch and the second switch are unidirectional switches.

In addition to one or more of the features described herein, or as an alternative, further embodiments of the system may include that the first switch and the second switch are bidirectional switches.

In addition to one or more of the features described herein, or as an alternative, further embodiments of the system may include that the selectively controlling is performed by one of the DC/DC converter, a low voltage bus controller, or a system controller.

In addition to one or more of the features described herein, or as an alternative, further embodiments of the system may include that selectively controlling based at least in part on the battery comprises selectively controlling based at least in part on a state of the battery.

The above features and advantages, and other features and advantages, of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

Figure 1:
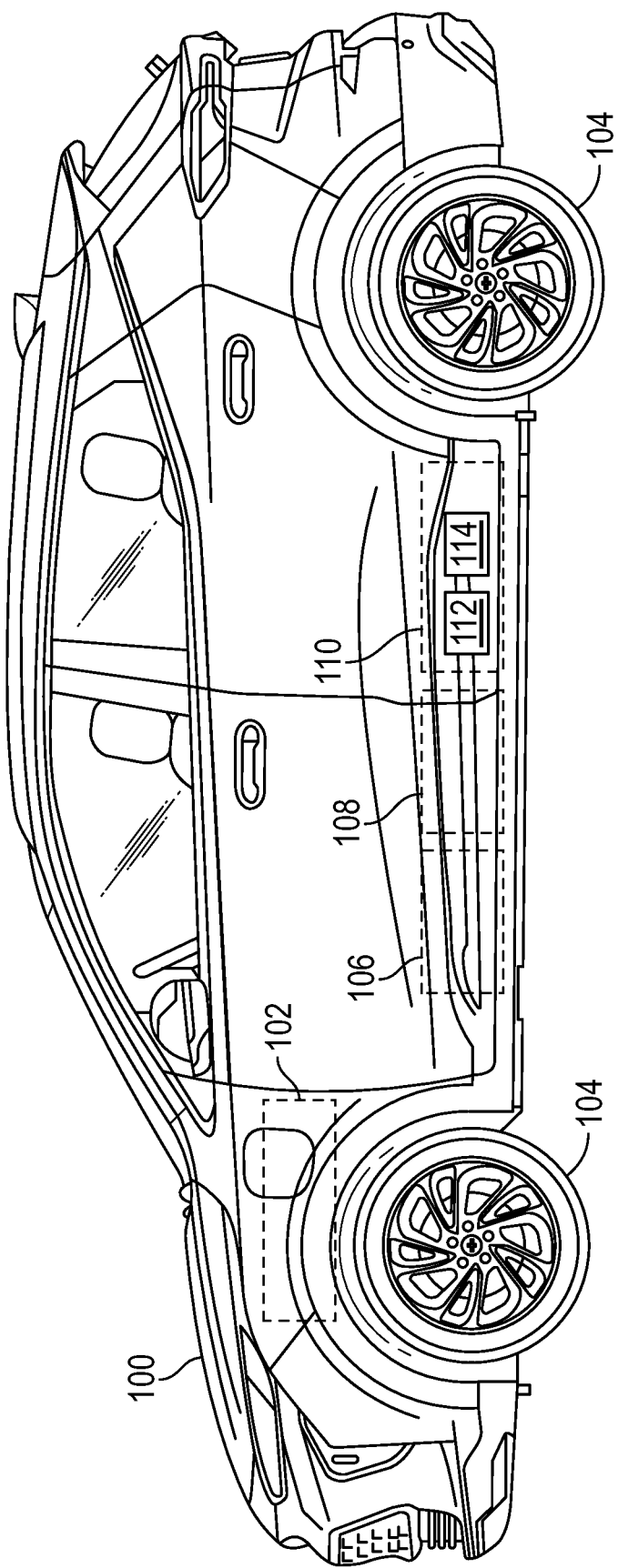
FIG. 1 shows a schematic illustration of a vehicle according to one or more embodiments described herein.

The following description is merely exemplary in nature and is not intended to limit the present disclosure, its application or uses. It should be understood that throughout the drawings, corresponding reference numerals indicate like or corresponding parts and features.

As described herein, a vehicle can include one or more electrical loads that are powered by one or more batteries. Some vehicles are equipped with low voltage batteries to provide electric power to some components, such as motors, lights, infotainment equipment, electronic control units, climate control systems, and/or the like, including combinations and/or multiples thereof. Some vehicles omit the low voltage batteries and instead provide electric power to low voltage components via a low voltage bus. One or more direct current (DC)/DC converters can be electrically coupled between the low voltage bus and a high voltage bus to reduce voltage and current from the high voltage bus.

Sometimes, multiple low voltage buses (also referred to as "auxiliary buses" or "auxiliary low voltage buses") can be used. For example, a first low voltage electrical load may be electrically connected to a first auxiliary low voltage bus and a second low voltage electrical load may be electrically connected to a first auxiliary low voltage bus. In such cases, the first and second auxiliary low voltage buses may operate at different voltages. For example, the first auxiliary low voltage bus may operate at substantially 12 volts and the second auxiliary low voltage bus may operate at substantially 14 volts. This can cause unequal load distribution across the auxiliary low voltage buses, which can accelerate battery cell/module imbalance.

It may be desirable to control the voltages or states of cells or groups of battery cells through power converters connected to different auxiliary buses. An example of a power converter is a DC/DC converter that can, for example, reduce voltage from a higher voltage to a lower voltage.

To address these and other low voltage power issues, one or more embodiments described herein provide for controlling the voltages or states of cells or groups of battery cells through power converters connected to different auxiliary low voltage buses. Embodiments described herein provide for power sharing, load sharing, and architectures for multiple auxiliary low voltage buses of vehicles, which are described in more detail herein. One or more of the embodiments described herein provide for sharing a common load at the output of DC/DC converters, which provides for load balancing across multiple auxiliary low voltage buses. Unequal load distribution across auxiliary low voltage buses can accelerate battery cell/module imbalance, cause battery cell/module performance issues, and other results.

One or more embodiments described herein provides for power sharing for multiple auxiliary low voltage buses of vehicles. For example, a central controller can be implemented to regulate the different auxiliary low voltage buses and introduce a differential voltage between two or more different auxiliary low voltage buses for power balancing.

One or more embodiments described herein provides for load sharing for multiple auxiliary low voltage buses of vehicles. For example, a central controller adjusts the target power consumption in each grid, where a grid controller adds or removes certain loads from the grid until balancing is achieved.

One or more embodiments described herein provides for load sharing for multiple auxiliary low voltage buses of vehicles. For example, output ports of DC/DC converters are connected to multiple controllable switchable paths, where a central controller selects which power path is activated at a given time.

One or more embodiments described herein provides architectures for multiple auxiliary low voltage buses of vehicles. For example, a DC/DC converter interfaces two (or more) auxiliary low voltage buses, providing a path for charge circulation between two grids. As another example, 2N distributed regulated DC/DC converters can be connected across N modules, where each set of distributed converters feed a certain grid. As yet another example, N distributed converters with multi-output ports can be used, where the regulated port is connected to a grid and non-regulated ports are connected to other grids. As used herein, "N" is a positive integer.

FIG. 1 shows a vehicle 100 according to one or more embodiments described herein. The vehicle 100 can be a car, a truck, a van, a bus, a motorcycle, a boat, or any other type of automobile. According to an embodiment, the vehicle 100 includes an internal combustion engine fueled by gasoline, diesel, or the like. According to another embodiment, the vehicle 100 is a hybrid electric vehicle partially or wholly powered by electrical power. According to another embodiment, the vehicle 100 is an electric vehicle powered by electrical power. In the example of FIG. 1, the vehicle 100 includes an prime mover 102, which can be an internal combustion engine, an electric motor, and/or the like, including combinations and/or multiples thereof. The prime mover 102 can be mechanically coupled to wheels 104 of the vehicle 100 to apply rotational force to the wheels 104, creating a driveline.

In some examples, a vehicle 100 can include one or more batteries 106 to provide electric power to electrical loads. Examples of electrical loads include electric motors, lights, infotainment equipment, electronic control units, climate control systems, and/or the like, including combinations and/or multiples thereof. According to one or more embodiments described herein, the one or more batteries 106 may provide substantially 100 volts of electric power, substantially 250 volts of electric power, substantially 400 volts of electric power, substantially 500 volts of electric power, substantially 650 volts of electric power, substantially 800 volts of electric power, substantially 1000 volts of electric power, and/or the like, including combinations and/or multiples thereof. This may be referred to as "high voltage" or "higher voltage." Some loads, like electric motors of electric vehicles used for propulsion (e.g., the prime mover 102), may operate at higher voltages. However, some loads, like lights and infotainment equipment, are referred to as "low voltage" loads or "lower voltage" loads and may operate at lower voltages. For example, low voltage loads may operate at substantially 12 volts, substantially 48 volts, and/or the like, including combinations and/or multiples thereof. To support these low voltage loads, the vehicle 100 can include at least one DC/DC converter 108 to convert DC electric power, such as from a higher voltage to a lower voltage, in the vehicle 100, which is described in more detail with reference to FIGS. 2A and 2B, for example. The low voltage loads can be electrically connected to the at least one DC/DC converter 108 by a low voltage bus (see, e.g., LV buses 214a, 214b of FIG. 2A) such that electric power is supplied to the low voltage loads at the low voltage.

In some examples, the DC/DC converter 108 is connected across the high voltage bus to convert DC electric power, such as from the full high voltage to a lower voltage. In other examples, the DC/DC converter 108 is formed by a plurality of DC/DC converters connected across a plurality of batteries, to convert a plurality of high voltages to a common low voltage.

The vehicle 100 can also include a controller 110. The controller 110 (e.g., also referred to as a "processing system") supports the management of electrical power through the vehicle 100. It is understood that one or more embodiments described herein is capable of being implemented in conjunction with any other type of computing environment now known or later developed. The controller 110 can include a processor 112, which may be one or more processing units and/or one or more multi-core processing units. In aspects of the present disclosure, each processing unit can include a reduced instruction set computer (RISC) microprocessor. As another example, the processor 112 can be a special-purpose processing device, such as application specific hardware, application specific integrated circuits (ASICs), application specific special processors (ASSPs), field programmable gate arrays (FPGAs), embedded controllers, hardwired circuitry, and/or the like, including combinations and/or multiples thereof. The processor 112 can be coupled to a memory 114, which can be any suitable type of memory device for storing data temporarily (e.g., random access memory (RAM)) and/or persistently (e.g., read only memory (ROM)). According to aspects of the present disclosure, managing current in low voltage buses of vehicles as described herein can be implemented using a combination of hardware and programming. The programming can be processor executable instructions stored on a tangible memory, and the hardware can include the processor 112 for executing those instructions. Thus a system memory (e.g., the memory 114) can store program instructions that when executed by the processor 112 can support the management of electrical power through the vehicle 100 as described in more detail herein.

Figure 2A:
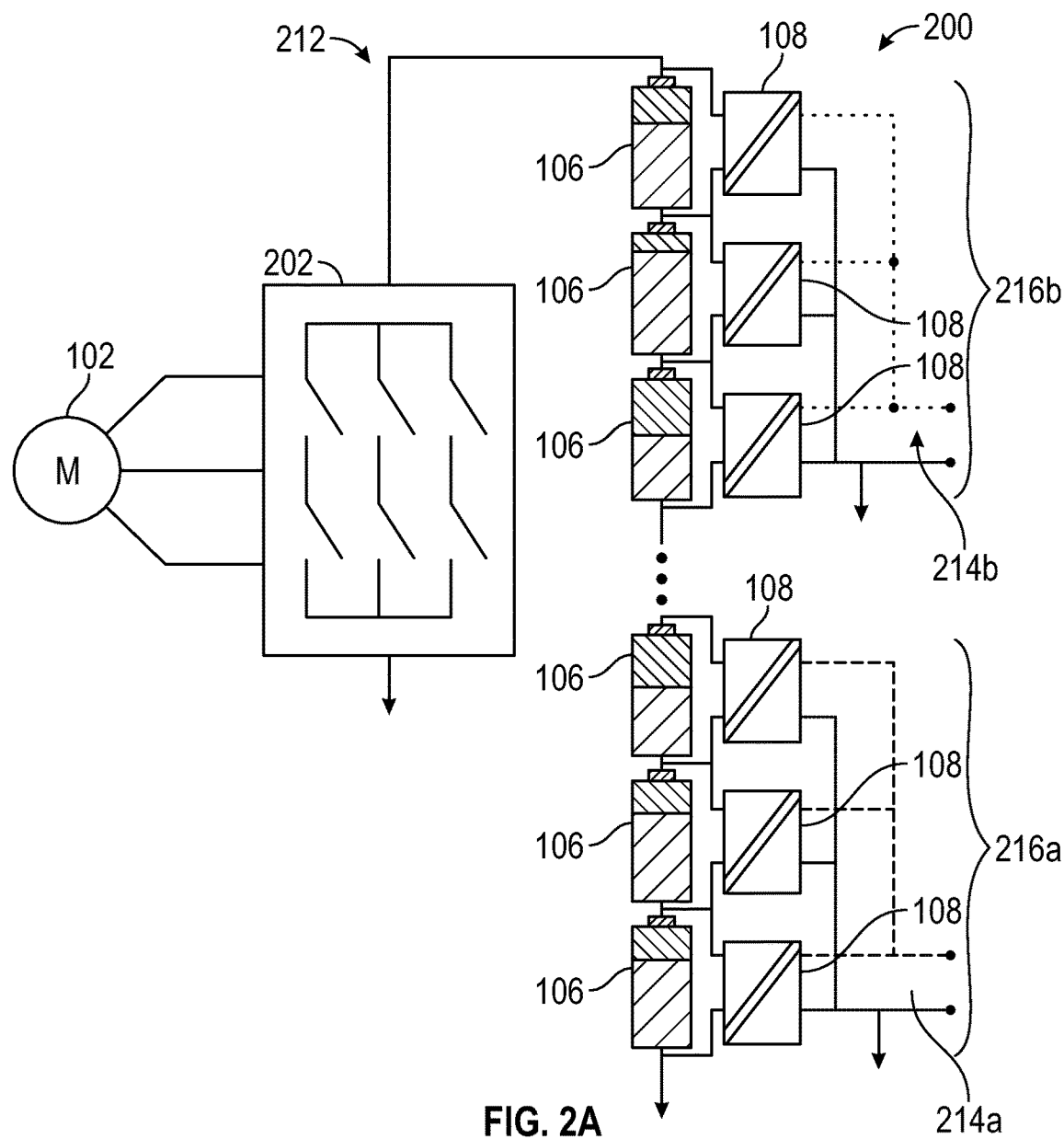
FIG. 2A shows a schematic illustrations of a circuit for providing electric power in a vehicle (e.g., the vehicle of FIG. 1) using batteries according to one or more embodiments described herein.
Figure 2B:
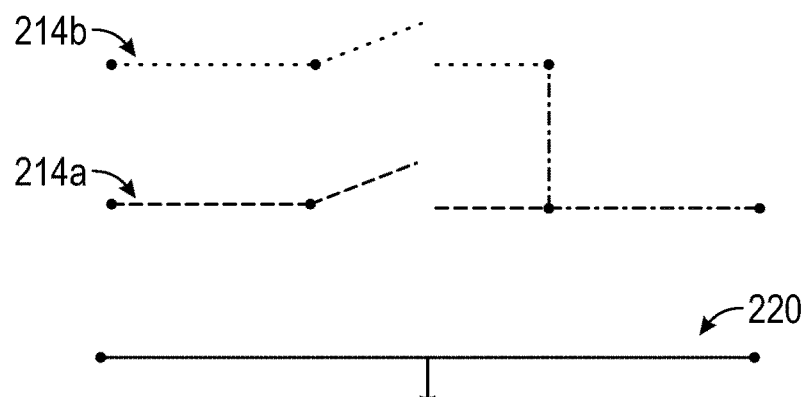
FIG. 2B shows a schematic illustration of a circuit having multiple auxiliary low voltage buses connected to form a common low voltage output according to one or more embodiments described herein.

FIGS. 2A and 2B are now described. Particularly, FIG. 2A shows a schematic illustrations of a circuit 200 for providing electric power in a vehicle (e.g., the vehicle 100) using batteries 106 according to one or more embodiments described herein. The batteries 106 include one or more battery cells or modules that provide electric power to the motor 102 via an inverter 202 across a high voltage bus 212.

The batteries 106 also provide electric power to one or more loads (not shown) connected to multiple auxiliary low voltage buses 214a, 214b to via at least one DC/DC converter 108. That is, the at least one DC/DC converter 108 outputs, using a parallel output connected configuration, electric power to the multiple auxiliary low voltage buses 214a, 214b. In the examples of FIG. 2A, the auxiliary low voltage bus 214a represents a first grid 216a (or "group"), and the auxiliary low voltage bus 214b represents a second grid 216b (or "group"). Although FIG. 2A shows an example with multiple DC/DC converters that provide power to each grid, it is understood that the concept presented in this disclosure is applicable to systems where one DC/DC converter is used to provide power to each grid.

In some cases, the voltage across the auxiliary low voltage bus 214a may differ from the voltage across the auxiliary low voltage bus 214b. The voltage difference can be due to loads not being equally distributed between the buses 214a, 214b. The voltage difference between the buses 214a, 214b (of the first grid 216a and the second grid 216b, respectively) can cause an imbalance between the cells and modules of the batteries 106 providing low voltage power to the first grid 216a and the second grid 216b.

According to an embodiment, as shown in FIG. 2B, the multiple auxiliary low voltage buses 214a, 214b can be connected to form a common low voltage output 220.

The DC/DC converters 108 described herein can be controlled, such as by the controller 110 of FIG. 1, to manage aspects (e.g., current, voltage, and/or the like, including combinations and/or multiples thereof) in multiple auxiliary low voltage buses 214a, 214b according to one or more embodiments described herein.

Figure 3A:
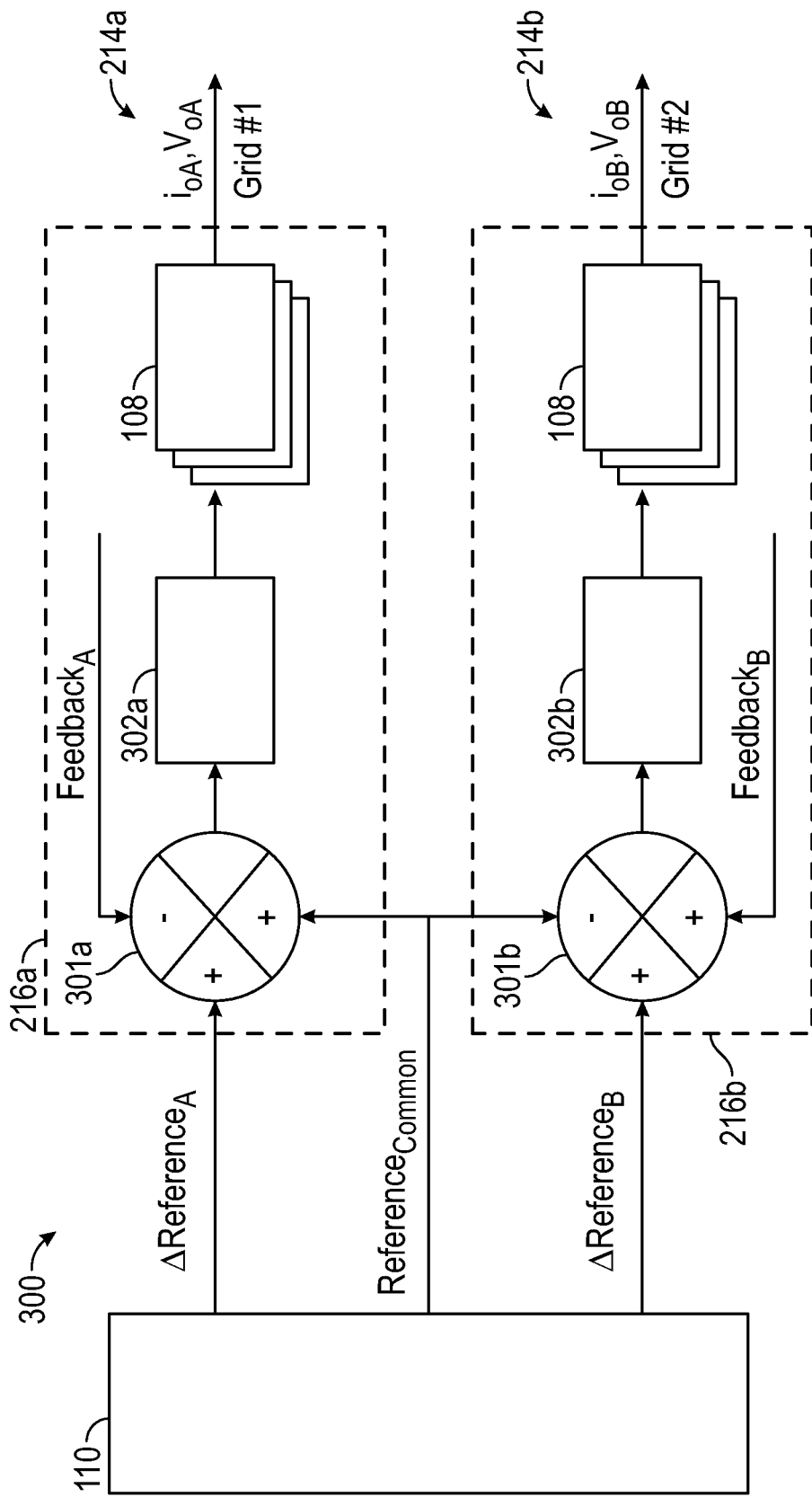
FIG. 3A shows a system for regulating the voltage between multiple auxiliary low voltage buses according to one or more embodiments described herein.
Figure 3B:
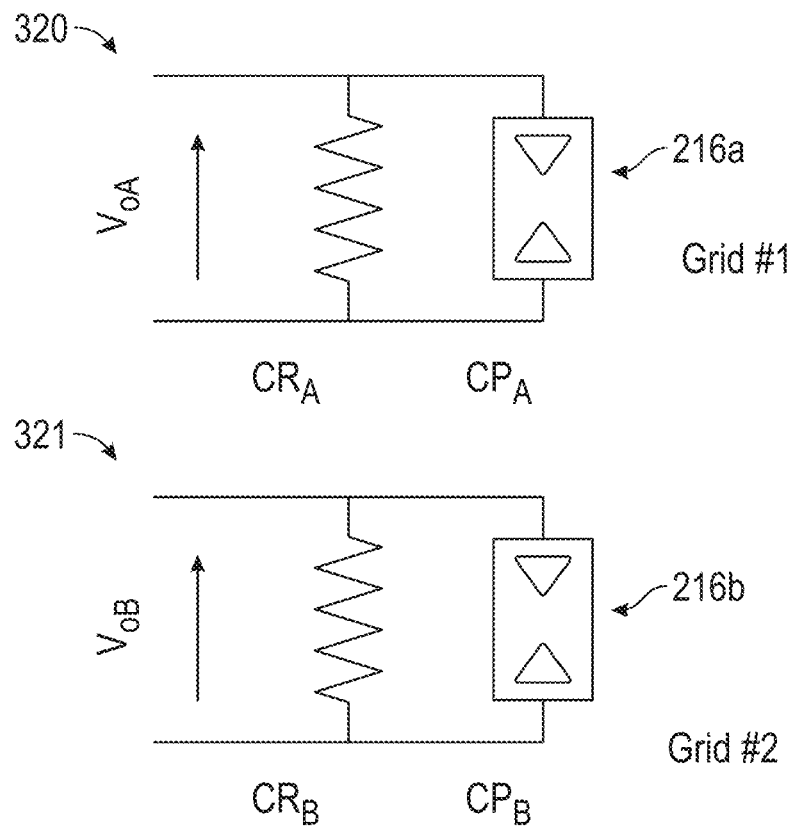
FIG. 3B shows circuits for generic loads across multiple grids according to one or more embodiments described herein.
Figure 4:
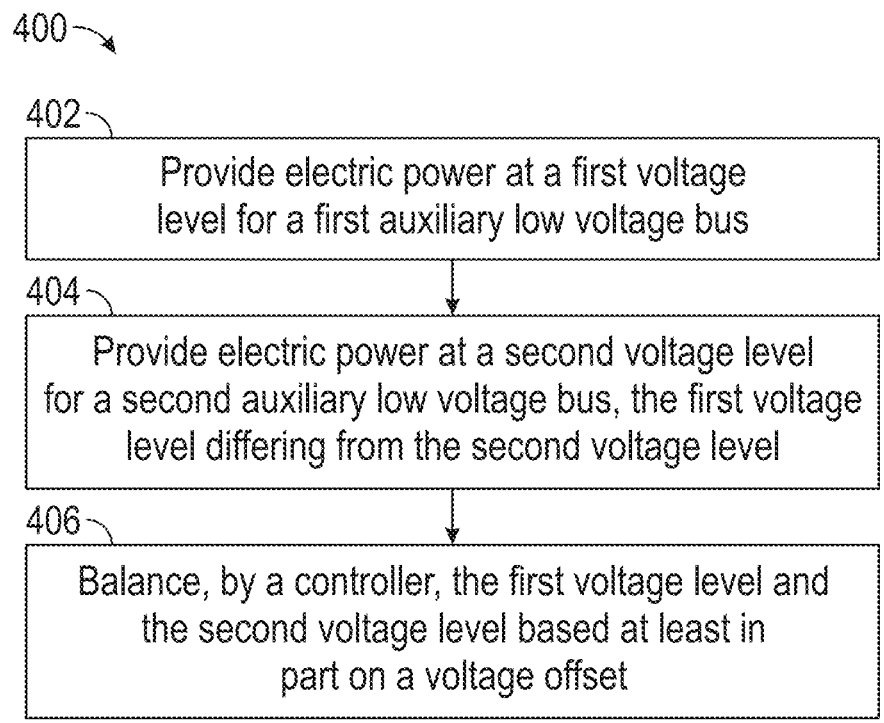
FIG. 4 shows a flow diagram of a method for power sharing for multiple auxiliary low voltage buses of vehicles according to one or more embodiments described herein.

FIGS. 3A, 3B, and 4 show one or more embodiments for power sharing for multiple auxiliary low voltage buses of vehicles and are now described.

Particularly, FIG. 3A shows a system 300 for regulating the multiple auxiliary low voltage busses to a common state, and applying a differential command between multiple auxiliary low voltage buses according to one or more embodiments described herein. The system 300 provides a closed-loop regulator for equalization of a multi-grid active balancing architecture.

In this example, the system 300 includes a controller 110 (also referred to as a "system controller"), the first grid 216a that provides the auxiliary low voltage bus 214a, and the second grid 216b that provides the auxiliary low voltage bus 214b. The controller 110 provides a common value as a reference (e.g., "Reference$_{common}$"), which can be expressed as a common state, which can be a common voltage, a function of a common voltage, a common average output current, a function in the common average output current, a common average input current, a function in the common average input current, a common battery state, or a function in a common battery state in the first grid 216a and the second grid 216b as shown in FIG. 3A. The battery state SOX described herein can be a state-of-charge (SOC), state-of-health (SOH), state-of-energy (SOE) state-of-life (SOL), or state-of-power (SOP) or a function in one or more of the battery states. In this example, the common value is then adjusted based on an offset at block 301a, 301b for to the first grid 216a and the second grid 216b, respectively. The offset, also referred to as a "change in reference" or "ΔReference," can be one or more of the following: a change in voltage ($\Delta v_{oA}$, $\Delta v_{oB}$), a function of a change in voltage ($f(\Delta v_{oA})$, $f(\Delta v_{oB})$), a change in the input current, a function of a change in the input current, a change in the output current, a function of a change in the output current, a change in the battery state, a function of a change in the battery state of, a function of power consumption, a state of charge of a particular group, an average state of charge of an entire battery pack, an average power consumption in the low voltage system, the power consumption of the combined batteries 106, a temperature of a certain group or multiple groups, and/or the like, including combinations and/or multiples thereof.

According to one or more embodiments described herein, a low voltage bus controller can be provided for each of the first grid 216a and the second grid 216b. For example, the first grid 216a includes a low voltage bus controller 302a, and the second grid 216b includes a low voltage bus controller 302b. The low voltage bus controllers 302a, 302b control the DC/DC converters 108 to adjust the output voltage ($v_{oA}$, $v_{oB}$) and/or output current ($i_{oA}$, $i_{oB}$) at the grids (e.g., the first grid 216a (also referred to as "Group A") and the second grid 216b (also referred to as "Group B").

According to an embodiment, the controller 110 adjusts the output voltage ($v_{oA}$, $v_{oB}$) and/or the output current ($i_{oA}$, $i_{oB}$) of one or more of the grids (e.g., the first grid 216a and/or the second grid 216b).

According to an embodiment, the controller 110 adjusts a voltage, current, SOX, and/or the like, including combinations and/or multiples thereof, of cell(s)/module(s) of one or more of the batteries 106 connected to a certain group that are connected to more than one grid.

According to an embodiment, the controller 110 adjusts control parameter(s) of multiple grids to a common reference, which can be the output voltage of each grid, output current of each grid, the average SOX of the cells or modules in a combined grid, the average input voltage of the cells or modules in a combined grid or group, a function of one or more parameters, and/or the like, including combinations and/or multiples thereof.

According to an embodiment, the controller 110 uses a voltage offset to equalize power drawn from individual grids (e.g., the first grid 216a and/or the second grid 216b) using a voltage offset command. The voltage offset commands may be generated using a logic-based technique, linear control technique, model predictive control technique, and/or the like, including combinations and/or multiples thereof. For example, (1) the controller 110 may evaluate the average state of charge in the cells/modules providing power to the individual low voltage busses, (2) based on the difference in states of charge in the low voltage busses, the controller 110 (3) introduces a ratiometric offset based on the command. As an example, the controller 110 regulates the two grids to a common value and introduce a +10% of the common value to grid A and −10% of the common command to grid B such that the total command to grid A is 1.1 times the common value, and the total command to grid B is 0.9 times the common value. The controller 110 continues the introduction of the offset command until the desired power consumption in the two grids is equal or nearly equal. The condition at which, for two grids, the power consumption is equal is the square root function shown below.

According to one or more embodiments described herein, the controller 110 can control the output voltage and/or the output current of the different grids based on a balancing condition expressed by the following equation, where the variables are defined according to the example circuits 320, 321 of FIG. 3B, which correspond to grid 1 and grid 2 of FIG. 3A, according to one or more embodiments described herein:

$$v_B = \sqrt{(CP_A - CP_B) * CR_B + \frac{v_A^2}{\frac{CR_A}{CR_B}}}.$$

Particularly, $v_A$ is the output voltage across grid 1, $v_B$ is the output voltage across grid 2, $CR_A$ is the resistance across grid 1, $CR_B$ is the resistance across grid 2, $CP_A$ is the power across grid 1, and $CP_B$ is the power across grid 2. This equation is based on the assumption that the loads are combinations of resistors and constant power loads. In other implementations, this equation may be different based on the type of components and/or loads being used. For example, an equation for constant current loads may be different.

FIG. 4 shows a flow diagram of a method 400 for power sharing for multiple auxiliary low voltage buses of vehicles according to one or more embodiments described herein. The method 400 can be performed by any suitable system, controller, device, and/or the like, including combinations and/or multiples thereof. For example, the controller 110 can perform the method 400. The method 400 is now described in more detail with respect to FIGS. 1, 2, 3A, and/or 3B but is not so limited. Although the method 400 is described with respect to adjusting a voltage, the method 400 is not so limited because the techniques described herein for adjusting voltage can also be applied to adjust a current.

The method 400 starts at block 402, where electric power is provided at a first voltage level (e.g., 12 volts) for a first auxiliary low voltage bus (e.g., the auxiliary low voltage bus 214a). At block 404, electric power is provided at a second voltage level (e.g., 14 volts) for a second auxiliary low voltage bus (e.g., the auxiliary low voltage bus 214b). The first voltage level differs from the second voltage level. At block 406, the controller 110 balances the first voltage level and the second voltage level based at least in part on a voltage offset as described with respect to FIG. 3A.

According to an embodiment, balancing the first voltage level and the second voltage is based at least in part on a resistive load distribution in common ports of the first auxiliary low voltage bus and the second auxiliary low voltage bus. As an example, the balancing is based at least in part on a square root function in resistance ratios in the first auxiliary low voltage bus and the second auxiliary low voltage bus.

According to an embodiment, balancing the first voltage level and the second voltage is based at least in part on a constant current load distribution in common ports of the first auxiliary low voltage bus and the second auxiliary low voltage bus. As an example, the balancing is based at least in part on a linear function in constant current load ratios of the first auxiliary low voltage bus and the second auxiliary low voltage bus. As another example, the balancing is based at least in part on a linear function in charging currents while charging a battery at an output port of a direct current (DC)/DC converter.

According to an embodiment, balancing the first voltage level and the second voltage is based at least in part on a resistive load distribution in common ports of the first auxiliary low voltage bus and the second auxiliary low voltage bus and is based at least in part on a constant current load distribution in common ports of the first auxiliary low voltage bus and the second auxiliary low voltage bus.

According to an embodiment, the balancing is based at least in part on a square root functions in resistance ratios and constant power in the first auxiliary low voltage bus and the second auxiliary low voltage bus.

According to an embodiment, the method 400 further includes adjusting, by the controller 110, at least one of the first voltage level and the second voltage level. For example, the adjusting is based at least in part on a common reference (e.g., the output voltage of each grid, the average SOX of the cells or modules in a combined grid, the average input voltage of the cells or modules in a combined grid or group, a function of one or more parameters, and/or the like, including combinations and/or multiples thereof).

Additional processes also may be included. For example, the techniques described in FIG. 4 can be used to adjust a voltage instead of or in addition to adjusting a current. It should be understood that the process depicted in FIG. 4 represents an illustration, and that other processes may be added or existing processes may be removed, modified, or rearranged without departing from the scope of the present disclosure.

FIGS. 5, 6A, 6B, and 7 show one or more embodiments for load sharing for multiple auxiliary low voltage buses of vehicles are now described.

Figure 5:
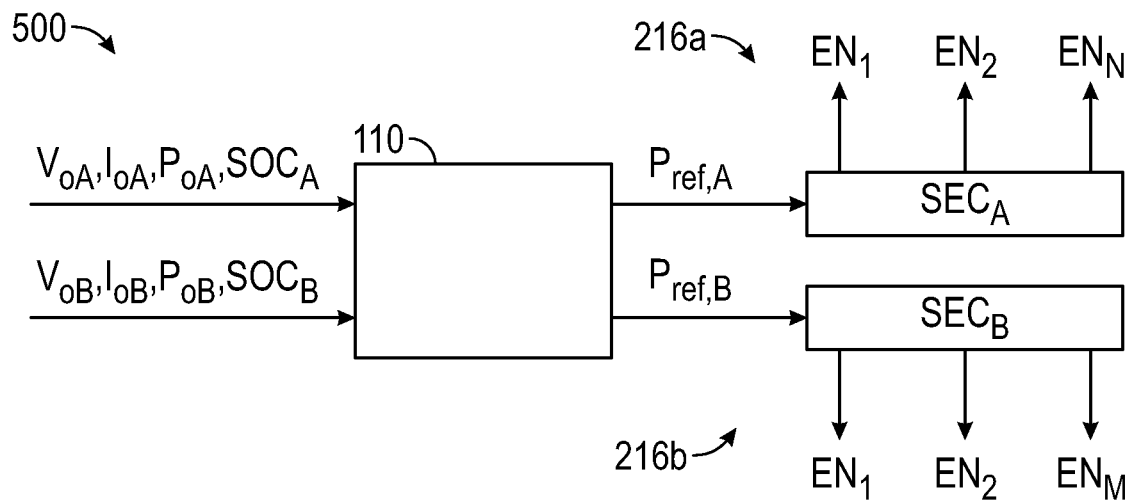
FIG. 5 shows a system for active load management for load sharing for multiple auxiliary low voltage buses of vehicles according to one or more embodiments described herein.
Figure 6A:
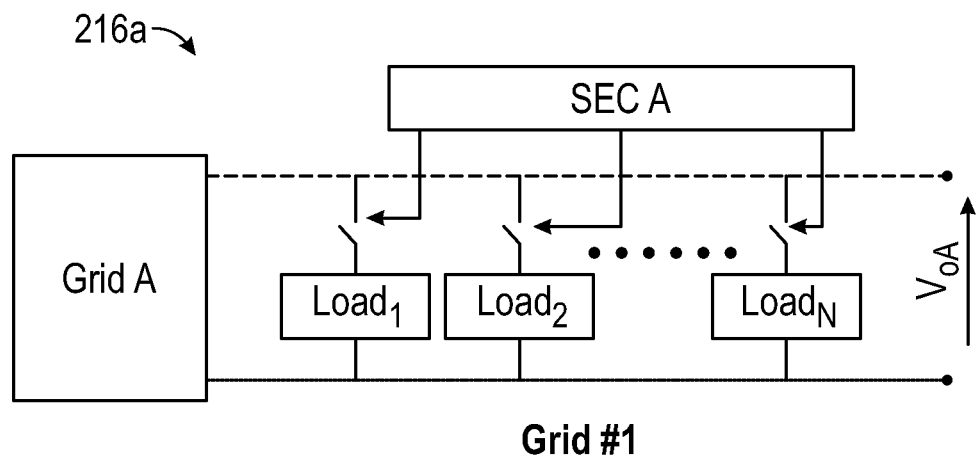
FIGS. 6A and 6B show circuits for selectively enabling/disabling loads for multiple auxiliary low voltage buses of vehicles according to one or more embodiments described herein.
Figure 6B:
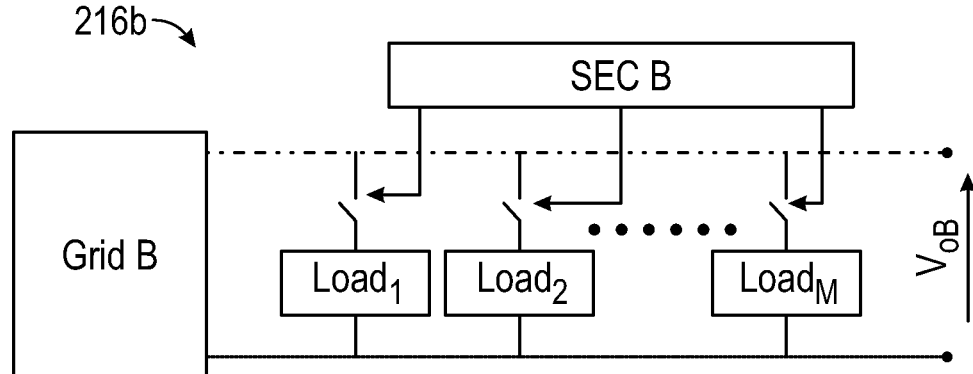

Particularly, FIG. 5 shows a system 500 for active load management for load sharing for multiple auxiliary low voltage buses of vehicles according to one or more embodiments described herein. In this example, the system 500 includes a controller 110 to adjust power draw in different grids, such as the first grid 216a and the second grid 216b. The controller 110 receives or measures the output voltage, current, and/or power for each of the grids, and/or state of charge (SOC) of batteries providing power in each of the grids. For example, the controller receives a voltage ($V_{oA}$), current ($I_{oA}$), power ($P_{oA}$), and SOC ($SOC_A$) for the first grid 216a and receives similar information (e.g., $V_{oB}$, $I_{oB}$, $P_{oB}$, $SOC_B$) for the second grid 216b. The controller 110 can calculate power consumption in each grid using the received information and can calculate a power difference between grids based on the power consumption in each grid. The controller 110 can then control switches for each grid to selectively enable (e.g., add) and/or disable (e.g., shed) loads within each grid. The controller 110 can output a power reference value (e.g., $P_{ref,A}$, $P_{ref,B}$) for each of the selectors $SEC_A$, $SEC_B$, where the power reference value represents how much power to provide in each grid. For example, the controller 110 can control $SEC_A$ in the first grid 216a to selectively enable/disable loads in the first grid 216a such that the power draw in grid 216a substantially equals the desired power reference $P_{ref,A}$, similarly the controller 110 and can control $SEC_B$ in the second grid 216b to selectively enable/disable loads in the second grid 216b such that the power draw in grid 216b substantially equals the desired power reference $P_{ref,B}$ as shown in FIGS. 6A and 6B. In other configurations, the controller 110 can directly enable/disable the desired loads in grid 216a, and grid 216b.

Figure 7:
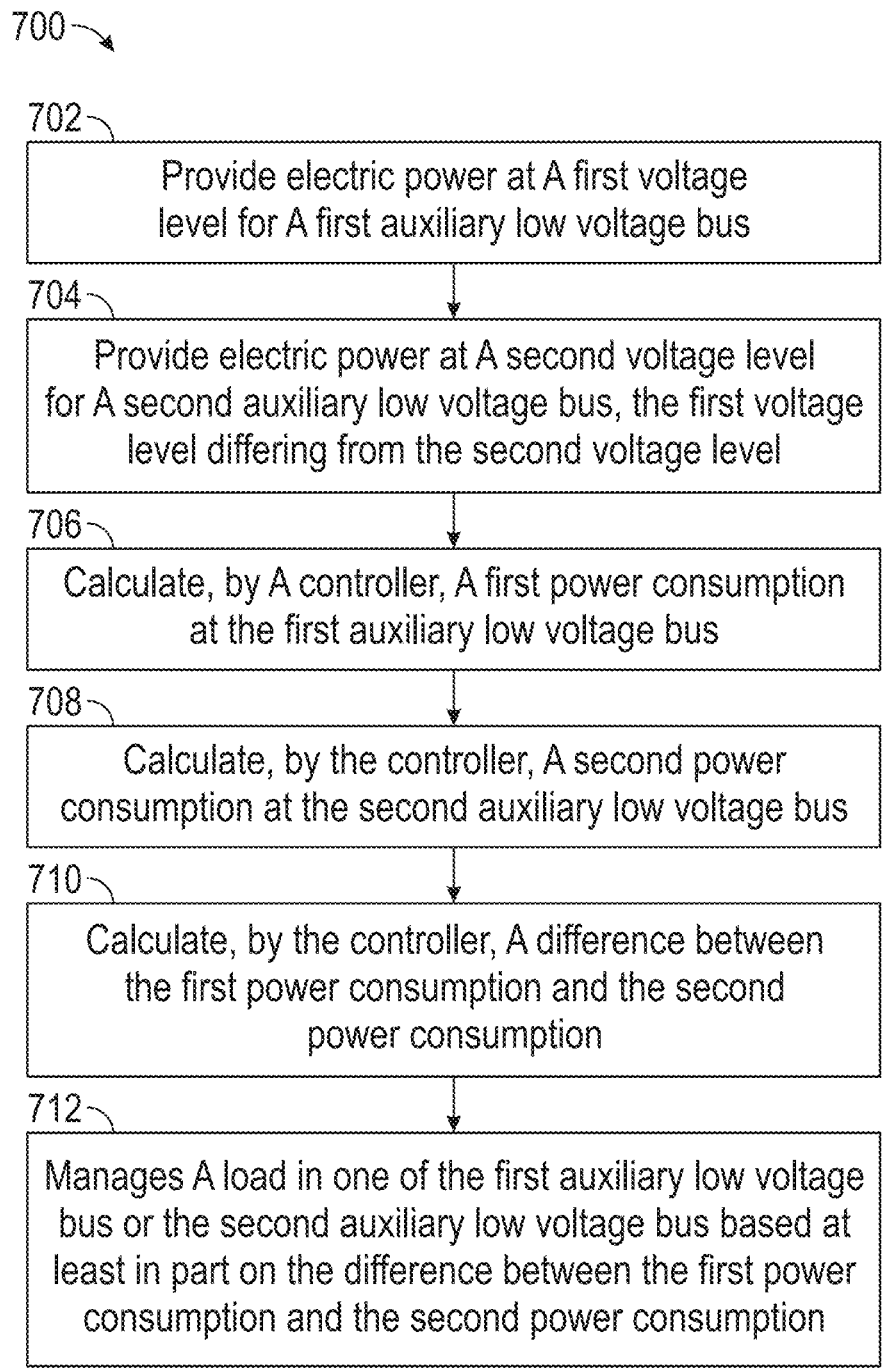
FIG. 7 shows a flow diagram of a method for load sharing for multiple auxiliary low voltage buses of vehicles according to one or more embodiments described herein.

FIG. 7 shows a flow diagram of a method 700 for load sharing for multiple auxiliary low voltage buses of vehicles according to one or more embodiments described herein. The method 700 can be performed by any suitable system, controller, device, and/or the like, including combinations and/or multiples thereof. For example, the controller 110 can perform the method 700. The method 700 is now described in more detail with respect to FIGS. 1, 2, 5, 6A, and/or 6B but is not so limited. Although the method 700 is described with respect to adjusting a voltage, the method 700 is not so limited because the techniques described herein for adjusting voltage can also be applied to adjust a current.

The method 700 starts at block 702, where electric power is provided at a first voltage level (e.g., 12 volts) for a first auxiliary low voltage bus (e.g., the auxiliary low voltage bus 214a). At block 704, electric power is provided at a second voltage level (e.g., 14 volts) for a second auxiliary low voltage bus (e.g., the auxiliary low voltage bus 214b). The first voltage level differs from the second voltage level.

At block 706, the controller 110 calculates or senses a first power consumption at the first auxiliary low voltage bus (e.g., for the first grid 216a). For example, the controller 110 can multiply the voltage ($V_{oA}$) and current ($I_{oA}$) for the first auxiliary low voltage bus to calculate the first power consumption at the first auxiliary low voltage bus ($P_{oA}$). At block 708, the controller 110 calculates or senses a second power consumption at the second auxiliary low voltage bus (e.g., for the second grid 216b). For example, the controller 110 can multiply the voltage ($v_{oB}$) and current ($I_{oB}$) for the second auxiliary low voltage bus to calculate the second power consumption at the second auxiliary low voltage bus ($P_{oB}$). At block 710, the controller 110 calculates a difference between the first power consumption and the second power consumption.

At block 712, based on the difference between the first power consumption and the second power consumption, the controller 110 manages a load in one of the first auxiliary low voltage bus (e.g., the first grid 216a) or the second auxiliary low voltage bus (e.g., the second grid 216b). An example of managing the load includes selectively enabling a load. Another example of managing the load includes selectively disabling a load. Yet another example of managing the load includes enabling load shedding in one of the first auxiliary low voltage bus (e.g., the first grid 216a) or the second auxiliary low voltage bus (e.g., the second grid 216b) based on which bus has the higher power consumption. Yet another example of managing the load includes enabling load shedding for the one of the multiple auxiliary low voltage buses having a higher power consumption and enabling another load in the one of the multiple auxiliary low voltage buses having a lower power consumption. Yet another example of managing the load includes enabling load shedding for the one of the multiple auxiliary low voltage buses having a low average state (e.g., SOX (e.g., state of charge, state of health, state of life, state of power, or state of energy)). The low average state is the lower/lowest SOX over a period of time or number of cycles as compared to other grids. Yet another example of managing the load includes enabling another load for the one of the multiple auxiliary low voltage buses having a high average state (e.g., SOX). The high average state is the higher/highest SOX over a period of time or number of cycles as compared to other grids. Yet another example of managing the load includes enabling load shedding for the one of the multiple auxiliary low voltage buses having a low average state and enabling another load for the one of the multiple auxiliary low voltage buses having a high average state. According to one or more embodiments described herein, the load shedding and/or the enabling of another load can be performed for a predefined time interval (e.g., 1 second, 2 seconds, 5 seconds, 10 seconds, 1 minute, 5 minutes and/or the like, including combinations and/or multiples thereof). According to one or more embodiments described herein, the load shedding and/or the enabling of another load can be performed until a particular power or average SOX is met. These and other examples are possible, and can be implemented in various combinations.

Additional processes also may be included. For example, the techniques described in FIG. 7 can be used to adjust a voltage instead of or in addition to adjusting a current. It should be understood that the process depicted in FIG. 4 represents an illustration, and that other processes may be added or existing processes may be removed, modified, or rearranged without departing from the scope of the present disclosure.

Figure 8:
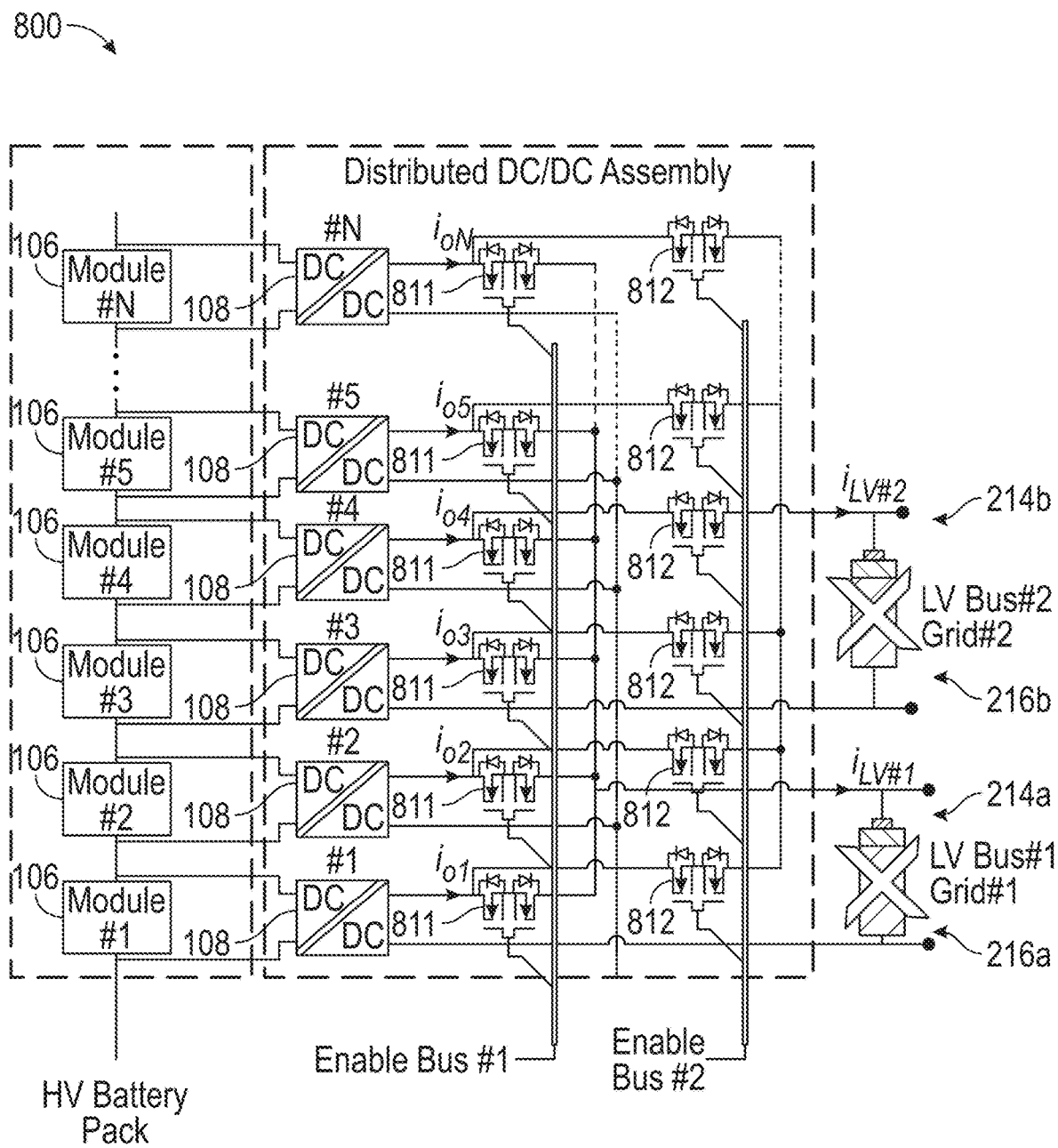
FIG. 8 shows a circuit for load sharing for multiple auxiliary low voltage buses of vehicles according to one or more embodiments described herein.
Figure 9:
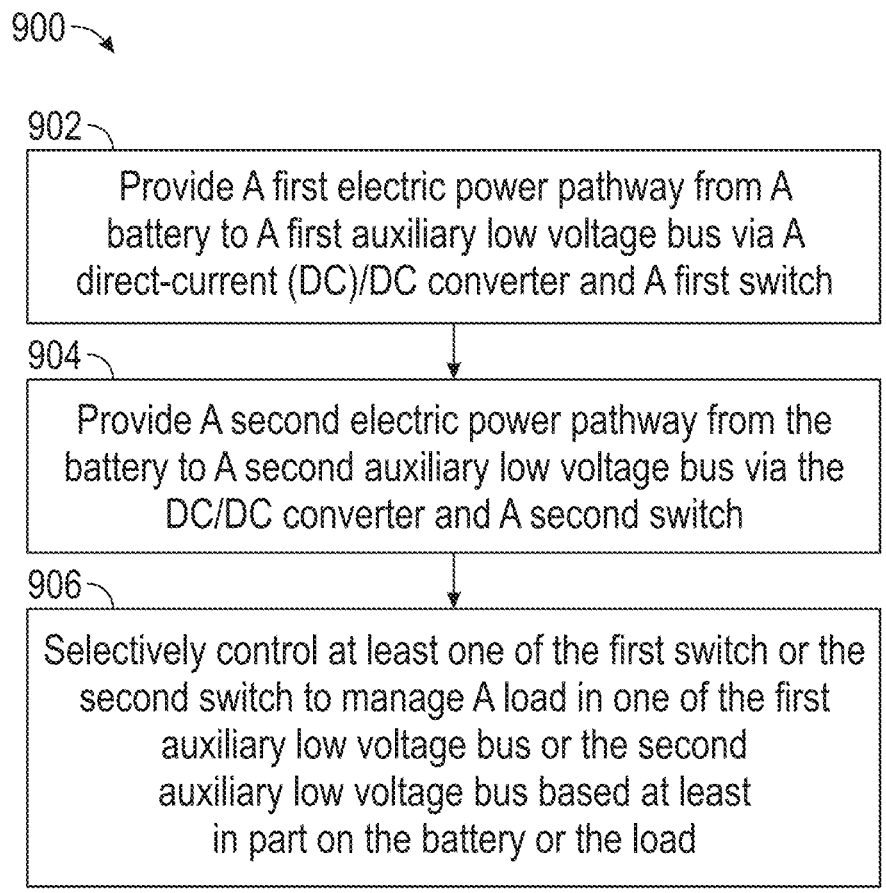
FIG. 9 shows a flow diagram of a method for load sharing for multiple auxiliary low voltage buses of vehicles according to one or more embodiments described herein.

FIGS. 8 and 9 show one or more embodiments for load sharing for multiple auxiliary low voltage buses of vehicles and are now described.

Particularly, FIG. 8 shows a circuit 800 for load sharing for multiple auxiliary low voltage buses of vehicles according to one or more embodiments described herein. The circuit 800 includes multiple batteries 106 (also referred to as "modules" or "battery modules") to provide electric power to the multiple auxiliary low voltage buses 214a, 214b. Particularly, the DC/DC converters 108 convert DC electric power, such as from the battery modules to the low voltage busses, as described herein. Output ports of DC/DC converters 108 are connected to multiple controllable switchable paths, where a central controller (e.g., the controller 110) selects which power path is activated at a given time by selectively opening and/or closing switches 811, 812. In this example, two switches 811, 812 are associated with each of the DC/DC converters 108. That is, each DC/DC converter 108 has two switches 811, 812 connected at the output of the DC/DC converter 108, and each of the two switches 811, 812 is associated with one of the two auxiliary low voltage buses 214a, 214b, configured and arranged as shown. For example, the battery 106a provides electrical power to the low voltage bus 214a via the DC/DC converter 108a and a first switch 811a. Similarly, the battery 106a provides electrical power to the low voltage bus 214b via the DC/DC converter 108a and a second switch 812b. According to one or more embodiments described herein, the switches 811, 812 are solid state switches, such as a metal-oxide-semiconductor field-effect transistor (MOSFET), or similar. According to one or more embodiments described herein, the switches 811, 812 are unidirectional switches, bidirectional switches, or a combination thereof. Although FIG. 8 shows an example with N modules, and N DC/DC converters, it is understood that N can be any integer that is greater than or equal to one.

FIG. 9 shows a flow diagram of a method 900 for load sharing for multiple auxiliary low voltage buses of vehicles according to one or more embodiments described herein. The method 900 can be performed by any suitable system, controller, device, and/or the like, including combinations and/or multiples thereof. For example, the controller 110 can perform the method 900. The method 900 is now described in more detail with respect to FIGS. 1, 2, 3A, and 8 but is not so limited.

The method 900 starts at block 902, where a first electric power pathway is provided from a battery to a first auxiliary low voltage bus via a DC/DC converter and a first switch. An example of the first electric power pathway is from the battery 106a (e.g., module #1) to DC/DC converter 108a (e.g., #1) via a first switch 811a, to the first low voltage bus 214a of the first grid 216a. The electric power delivered by the first electric power pathway is labeled as low voltage current #1 ($i_{LV\ \#1}$). At block 904, a second electric power pathway is provided from the battery to a second auxiliary low voltage bus via the DC/DC converter and a second switch. An example of the second electric power pathway is from the battery 106a (e.g., module #1) to DC/DC converter 108a (e.g., #1) via a second switch 812a, to the second low voltage bus 214b of the second grid 216b. The electric power delivered by the second electric power pathway is labeled as low voltage current #2 ($i_{LV\ \#1}$).

At block 906, the method 900 includes selectively controlling at least one of the first switch (e.g., the first switch 811a) or the second switch (e.g., the second switch 812b) to manage a load in one of the first auxiliary low voltage bus (e.g., the bus 214a) or the second auxiliary low voltage bus (e.g., the bus 214b) based at least in part on the battery or the load. For example, one or more of the DC/DC converter 108a, a low voltage bus controller (e.g., the LV bus controller 302a), or a system controller (e.g., the controller 110) can generate an "enable bus" command that enables one or more of the buses 214a, 214b using, respectively, the switches 811 and/or 812. The "enable bus" command can be generated, for example, based on the battery (e.g., the SOX of a cell/module/pack) and/or based on the load (e.g., based on the power consumption in each grid). Selectively controlling the switches 811, 812 provides for balancing (e.g., load distribution) in the low voltage system to reduce battery cell/module imbalance, for example.

According to one or more embodiments described herein, selectively enabling a switch (or multiple switches) is based at least in part on a settling time of an output voltage or current of the DC/DC converter 108. For example, the switches 811, 812 can be turned on (e.g., enabled) or turned off (e.g., disabled) for periods that are significantly longer (e.g., 2×, 5×, etc.) than the settling time of the output voltage or current of the DC/DC converter 108. As another example, the switches 811, 812 can be turned on (e.g., enabled) or turned off (e.g., disabled) for periods that are significantly shorter (e.g., ½, ⅕, etc.) than the settling time of the output voltage or current of the DC/DC converter 108.

According to one or more embodiments described herein, first switch and the second switch circulate electric power between the first auxiliary low voltage bus and the second auxiliary low voltage bus during transients.

According to one or more embodiments described herein, multiple of the first switches 811 can be enabled/disabled synchronously to form a group of modules. Similarly, multiple of the second switches 812 can be enabled/disabled synchronously to form a group of modules. As an example, the controller 110 can turn on and turn off the switches 811, 812 in groups to balance a state of charge of groups of batteries 106.

Additional processes also may be included. For example, the techniques described in FIG. 9 can be used to adjust a voltage instead of or in addition to adjusting a current. It should be understood that the process depicted in FIG. 9 represents an illustration, and that other processes may be added or existing processes may be removed, modified, or rearranged without departing from the scope of the present disclosure.

FIGS. 10, 11, 12A, 12B, 13A, 13B, and 14 show one or more embodiments for architectures for multiple auxiliary low voltage buses of vehicles and are now described.

Figure 10:
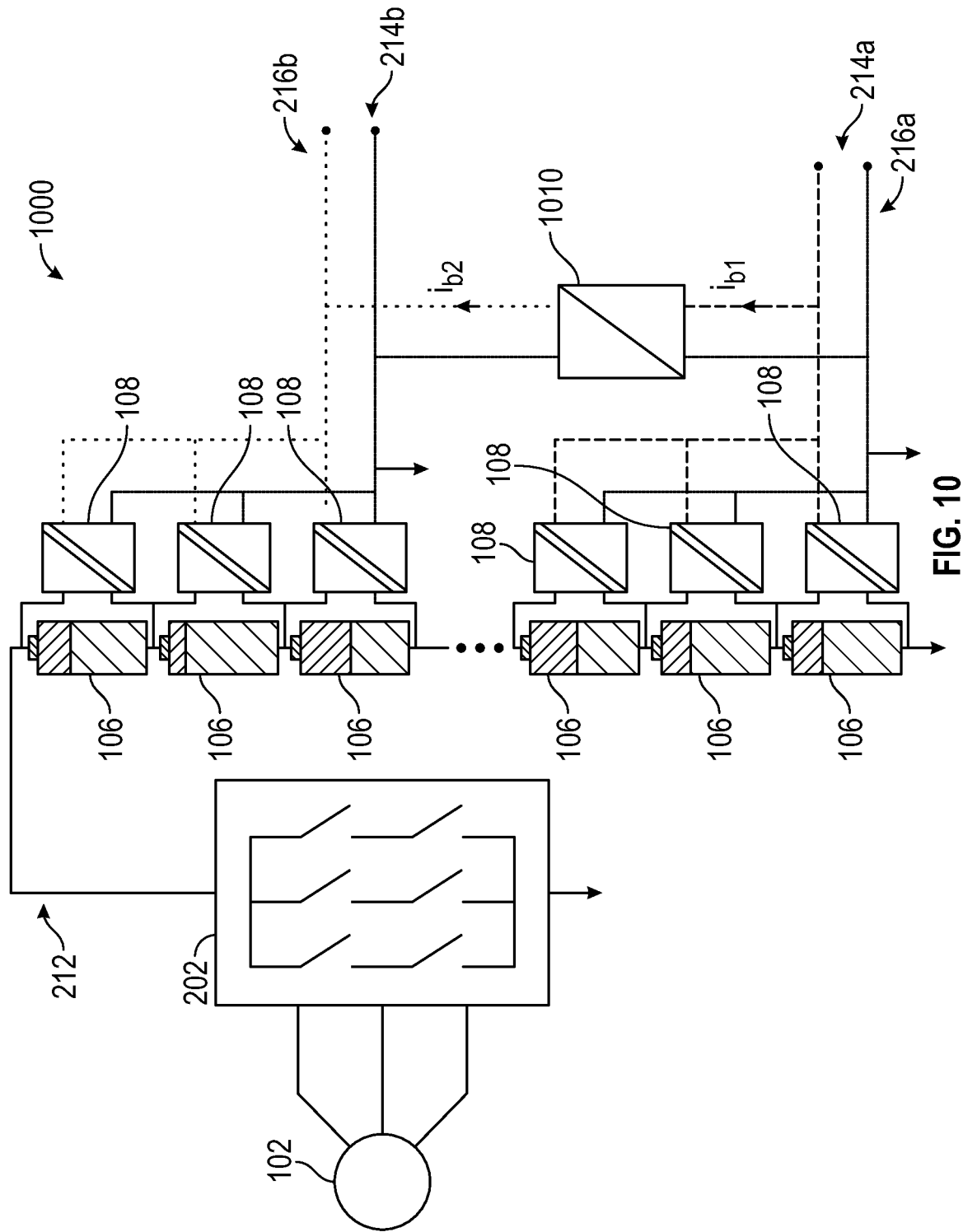
FIG. 10 depicts a circuit that includes a DC/DC bypass converter according to one or more embodiments described herein.

According to one or more embodiments described herein, the circuit 200 can be modified by adding a DC/DC bypass converter to manage the power or state of charge between two grids. For example, FIG. 10 depicts a circuit 1000 that includes a DC/DC bypass converter 1010 according to one or more embodiments described herein. In this example, the DC/DC bypass converter can control electric power flow between two grids 216a, 216b (e.g., between the multiple auxiliary low voltage buses 214a, 214b). For example, the DC/DC bypass converter 1010 can inject/absorb a current $i_{b1}$ from the bus 214a to absorb/inject a current $i_{b2}$, which is input into the bus 214b. As such, the DC/DC bypass converter 1010 provides for managing the power, state of charge, and/or the like, including combinations and/or multiples thereof, between two (or more) grids or groups. Accordingly, the DC/DC bypass converter 1010 supports unidirectional and/or bidirectional capability to achieve fast state of charge, voltage control, load balancing, and/or the like, including combinations and/or multiples thereof in auxiliary low voltage buses with unequal loads. For example, the DC/DC bypass converter 1010 can be unidirectional in that the DC bypass converter 1010 can convert electrical power from a first bus to a second bus but not from the second bus to the first bus. As another example, the DC/DC bypass converter 1010 can be bidirectional in that the DC bypass converter 1010 can convert electrical power from the first bus to the second bus and from the second bus to the first bus.

According to one or more embodiments described herein, the DC/DC bypass converter 1010 includes a first port and a second port having substantially equal volt-amp ratings. According to one or more embodiments described herein, the DC/DC bypass converter 1010 includes a first port and a second port having different volt-amp ratings. According to one or more embodiments described herein, the DC/DC bypass converter 1010 has a power specification, which can be based at least in part on a voltage rating of one or more of the first auxiliary low voltage bus and the second auxiliary low voltage bus, based at least in part on a power rating of one or more of the first auxiliary low voltage bus and the second auxiliary low voltage bus, and/or based at least in part on a battery providing the electric power. According to one or more embodiments described herein, DC/DC bypass converter 1010 is an isolated converter (e.g., the input and output stages have separate grounds) or a non-isolated converter (e.g., the input and output stages have a shared ground).

Figure 11:
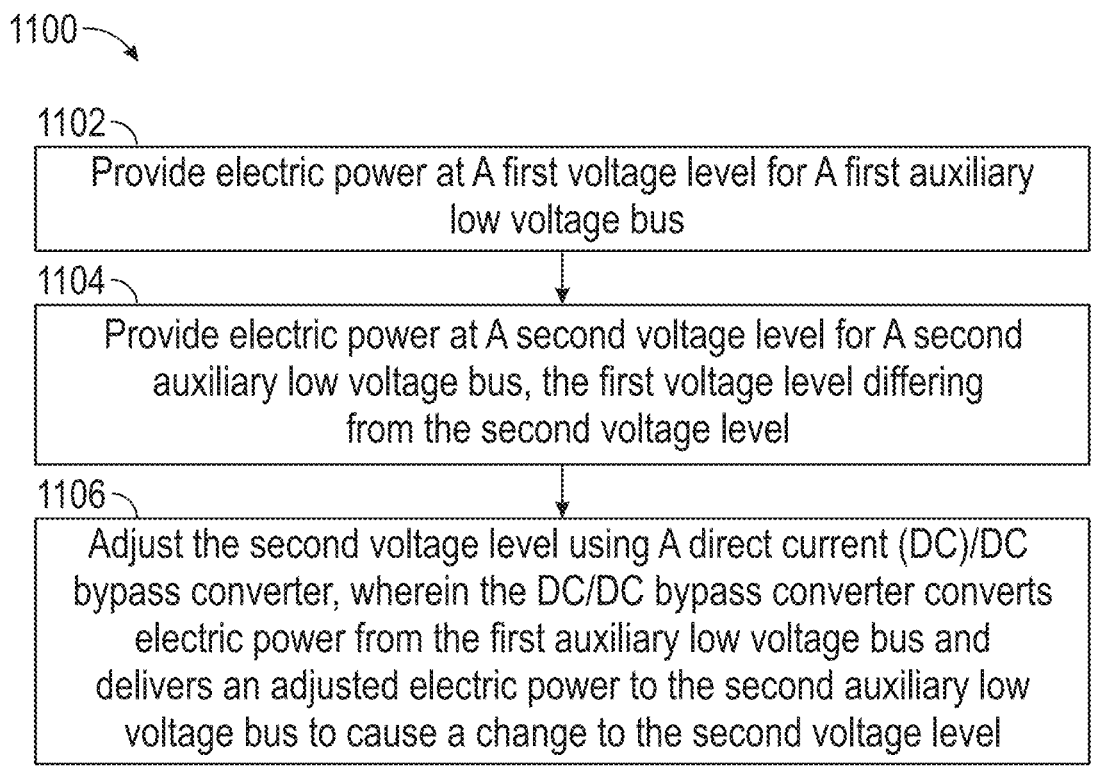
FIG. 11 shows a flow diagram of a method for load balancing for multiple auxiliary low voltage buses of vehicles according to one or more embodiments described herein.

FIG. 11 shows a flow diagram of a method 1100 for load balancing for multiple auxiliary low voltage buses of vehicles according to one or more embodiments described herein. The method 1100 can be performed by any suitable system, controller, device, and/or the like, including combinations and/or multiples thereof. For example, the controller 110 can perform the method 1100. The method 1100 is now described in more detail with respect to FIGS. 1, 2, and/or 10 but is not so limited. Although the method 1100 is described with respect to adjusting a voltage, the method 1100 is not so limited because the techniques described herein for adjusting voltage can also be applied to adjust a current.

The method 1100 starts at block 1102, where electric power is provided at a first voltage level (e.g., 12 volts) for a first auxiliary low voltage bus (e.g., the auxiliary low voltage bus 214a). At block 1104, electric power is provided at a second voltage level (e.g., 14 volts) for a second auxiliary low voltage bus (e.g., the auxiliary low voltage bus 214b). The first voltage level differs from the second voltage level. At block 1106, the first voltage level is adjusted using the DC/DC bypass converter 1100. Particularly, as described with respect to FIG. 10, the DC/DC bypass converter 1100 converts electric power from the first auxiliary low voltage bus (e.g., the bus 214a) and delivers an adjusted electric power to the second auxiliary low voltage bus (e.g., the bus 214b) to cause a change to the second voltage level. According to an embodiment, the adjusting occurs continuously. According to one or more embodiments described herein, the adjusting occurs based at least in part on a power or voltage consumption of at least one first auxiliary low voltage bus and the second auxiliary low voltage bus.

Additional processes also may be included. For example, the techniques described in FIG. 11 can be used to adjust a voltage instead of or in addition to adjusting a current. It should be understood that the process depicted in FIG. 11 represents an illustration, and that other processes may be added or existing processes may be removed, modified, or rearranged without departing from the scope of the present disclosure.

Figure 12A:
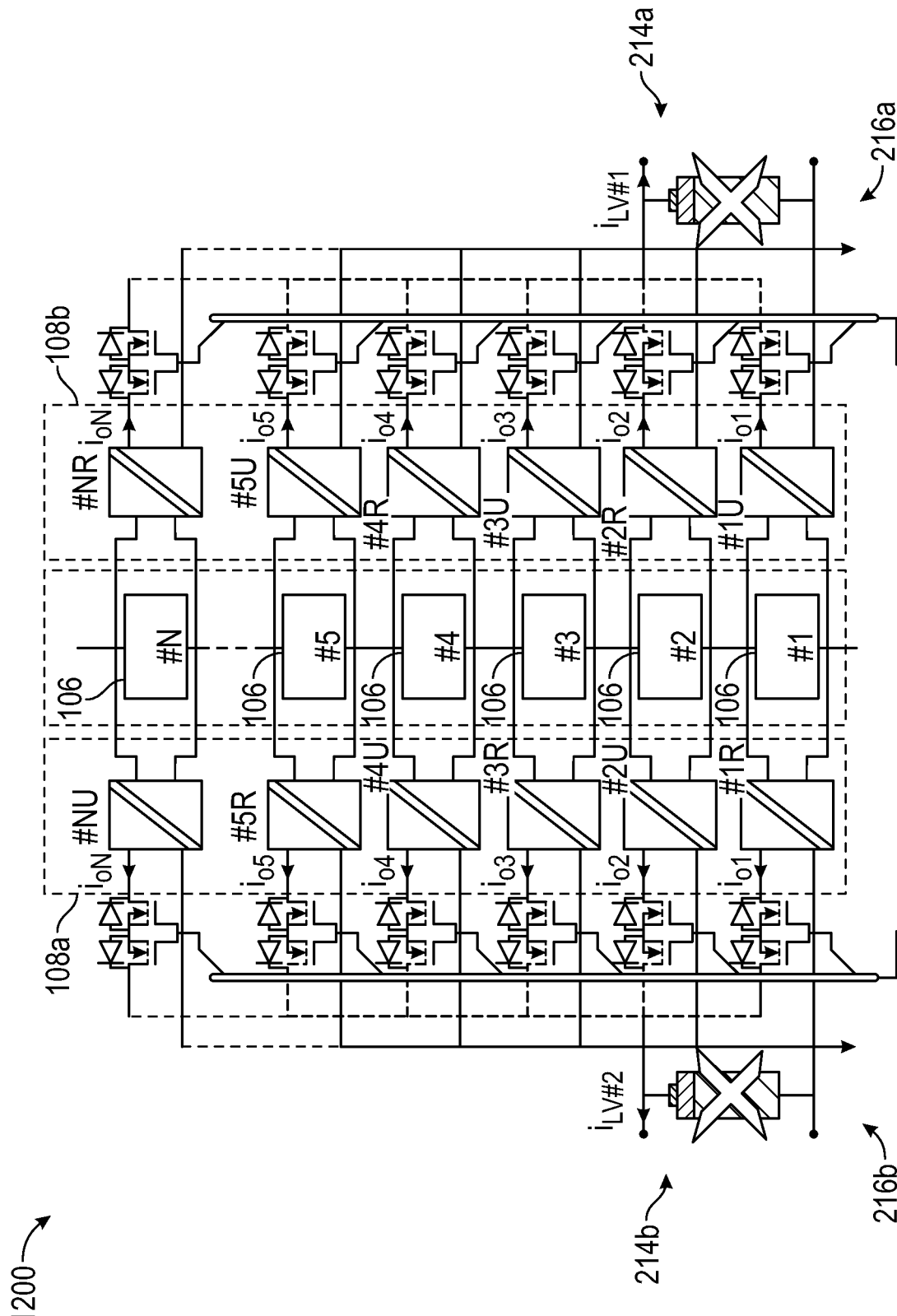
FIG. 12A depicts a circuit that includes a first DC/DC converter and a second DC/DC converter associated with each of the batteries according to one or more embodiments described herein.

According to one or more embodiments described herein, the circuit 200 can be modified by adding two DC/DC converters for each battery 106 (e.g., each module) to manage the power or state of charge between two grids. For example, FIG. 12A depicts a circuit 1200 that includes a first DC/DC converter 108a and a second DC/DC converter 108b associated with each of the batteries 106 (e.g., the module #1, the module #2, the module #3, the module #4, the module #5, . . . the module #N). Accordingly, the circuit 1200 includes N batteries 106 and 2N DC/DC converters 108a, 108b. As yet another example, a single multiport DC/DC converter can be used as two DC/DC converters as discussed herein with reference to FIG. 12C.

Figure 12B:
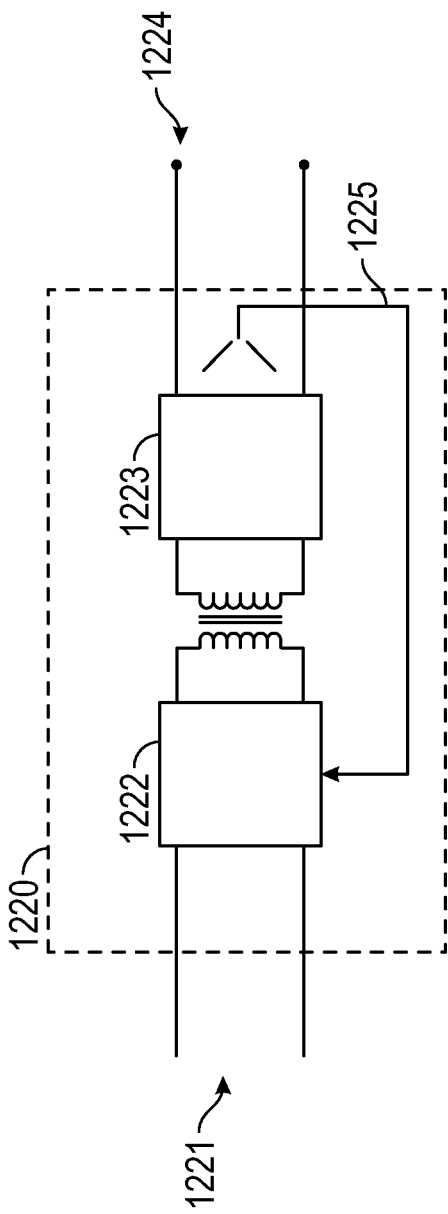
FIG. 12B depicts a regulated and isolated DC/DC converter according to one or more embodiments described herein.

According to one or more embodiments described herein, one or more of the DC/DC converters 108 described herein can be regulated and isolated DC/DC converters as shown in FIG. 12B. In this example, a regulated and isolated DC/DC converter 1220 receives input DC power 1221, which is converted to alternating current (AC) at block 1222. At block 1223 the AC is converted back to DC, and a regulated output 1224 is generated along with a feedback and control signal 1225, which is fed back into block 1222. The regulated and isolated DC/DC converter 1220 can be used as one converter per grid (see, e.g., FIG. 2), where the grids are independently controlled.

Figure 12C:
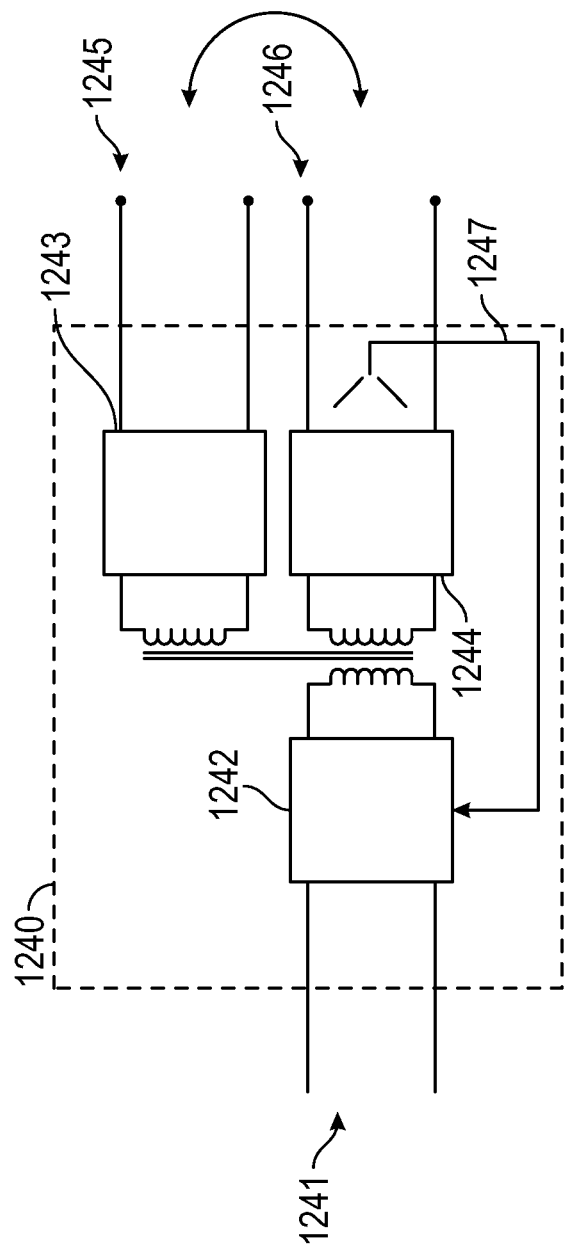
FIG. 12C depicts an isolated multi-port/multi-winding DC/DC converter according to one or more embodiments described herein.

According to one or more embodiments described herein, one or more of the DC/DC converters 108 described herein can be isolated multi-port/multi-winding DC/DC converters as shown in FIG. 12C. In this example, an isolated multi-port/multi-winding DC/DC converter 1240 receives input DC power 1241, which is converted to AC at block 1242. At block 1243 and 1244, the AC is converted back to DC, with the block 1243 generating an unregulated output 1245 and the block 1244 generating a regulated output 1246. The block 1244 can also generate a feedback and control signal 1247, which is fed back into block 1242. The isolated multi-port/multi-winding DC/DC converter 1240 can be used where multiple converters are used per battery (see, e.g., FIG. 12A). For example, with reference to FIG. 12A, a regulated port (e.g., the output of block 1244) is connected to one grid (designated "R" for regulated) on the circuit 1200, and an unregulated port (e.g., the output of block 1243) is connected to the other grid (designated "U" for "unregulated) on the circuit 1200. According to one or more embodiments described herein, connections can be staggered such that the number of regulated ports in each grid is substantially equal (e.g., 4 unregulated ports and 4 regulated ports in each grid, e.g., 5 unregulated ports and 4 regulated ports in each grid, and/or the like, including combinations and/or multiples thereof).

One or more embodiments described herein improve the operation of vehicles by providing for improved management of auxiliary low voltage buses. For example, battery state of charge, health, power, life, energy, and the like are improved by providing for load balancing across multiple auxiliary low voltage buses using one or more of the techniques described herein.

The terms "a" and "an" do not denote a limitation of quantity, but rather denote the presence of at least one of the referenced item. The term "or" means "and/or" unless clearly indicated otherwise by context. Reference throughout the specification to "an aspect", means that a particular element (e.g., feature, structure, step, or characteristic) described in connection with the aspect is included in at least one aspect described herein, and may or may not be present in other aspects. In addition, it is to be understood that the described elements may be combined in any suitable manner in the various aspects.

When an element such as a layer, film, region, or substrate is referred to as being "on" another element, it can be directly on the other element or intervening elements may also be present. In contrast, when an element is referred to as being "directly on" another element, there are no intervening elements present.

Unless specified to the contrary herein, all test standards are the most recent standard in effect as of the filing date of this application, or, if priority is claimed, the filing date of the earliest priority application in which the test standard appears.

Unless defined otherwise, technical and scientific terms used herein have the same meaning as is commonly understood by one of skill in the art to which this disclosure belongs.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

What is claimed is:

1. A method for load sharing for multiple auxiliary low voltage buses of a vehicle, the method comprising:
providing a first electric power pathway from a battery to a first auxiliary low voltage bus via a first direct-current (DC)/DC converter and a first switch, wherein electrical power is provided at a first voltage level for the first auxiliary low voltage bus;
providing a second electric power pathway from the battery to a second auxiliary low voltage bus via a second DC/DC converter and a second switch, wherein electrical power is provided at a second voltage level for the first auxiliary low voltage bus, the second voltage level differing from the first voltage level;
selectively controlling at least one of the first switch or the second switch to manage a load in one of the first auxiliary low voltage bus or the second auxiliary low voltage bus based at least in part on the battery; and
selectively controlling, by a controller, at least one of an output voltage or an output current of at least one of a first grid associated with the first auxiliary low voltage bus or a second grid associated with the second auxiliary low voltage bus, the at least one of an output voltage or the output current being based on a balancing condition expressed by the following equation:

$$v_B = \sqrt{(CP_A - CP_B) * CR_B + \dfrac{\dfrac{v_A^2}{CR_A}}{CR_B}}$$

where $v_A$ is an output voltage across a first grid associated with the first auxiliary low voltage bus, $v_B$ is an output voltage across a second grid associated with the second auxiliary low voltage bus, $CR_A$ is a resistance across the first grid, $CR_B$ is a resistance across the second grid, $CP_A$ is a power across the first grid, and $CP_B$ is a power across the second grid.

2. The method of claim 1, wherein the first switch and the second switch are solid state switches.

3. The method of claim 1, wherein the first switch and the second switch are unidirectional switches.

4. The method of claim 1, wherein the first switch and the second switch are bidirectional switches.

5. The method of claim 1, wherein the selectively controlling is performed by one of the first DC/DC converter, the second DC/DC converter, a low voltage bus controller, or a system controller.

6. The method of claim 1, wherein selectively controlling comprises enabling load shedding in one of the first auxiliary low voltage bus or the second auxiliary low voltage bus based on which bus has the higher power consumption.

7. The method of claim 1, wherein selectively controlling comprises enabling load shedding for one of first auxiliary low voltage bus or the second auxiliary low voltage bus having a low average states.

8. The method of claim 1, wherein selectively controlling the at least one of the first switch or the second switch comprises enabling at least one of the first switch or the second switch.

9. The method of claim 8, wherein the at least one of the first switch or the second switch is enabled for a period of time longer than a settling time of an output voltage or current of the first DC/DC converter or the second DC/DC converter.

10. The method of claim 8, wherein the at least one of the first switch or the second switch is enabled for a period of time shorter than a settling time of an output voltage or current of the first DC/DC converter or the second DC/DC converter.

11. The method of claim 1, wherein selectively controlling the at least one of the first switch or the second switch comprises disabling at least one of the first switch or the second switch.

12. The method of claim 11, wherein the at least one of the first switch or the second switch is disabled for a period of time longer than a settling time of an output voltage or current of the first DC/DC converter or the second DC/DC converter.

13. The method of claim 12, wherein the at least one of the first switch or the second switch is disabled for a period of time shorter than a settling time of an output voltage or current of the first DC/DC converter or the second DC/DC converter.

14. A system for load sharing for multiple auxiliary low voltage buses of a vehicle, the system comprising:
- a battery;
- a first grid connected to the battery, the first grid comprising a first low voltage bus controller, a first direct-current (DC)/DC converter, and a first switch, the first grid providing electric power at a first voltage level for a first auxiliary low voltage bus;
- a second grid connected to the battery, the second grid comprising a second low voltage bus controller, and a second DC/DC converter, and a second switch, the second grid providing electric power from the battery at a second voltage level for a second auxiliary low voltage bus, the second voltage level differing from the first voltage level; and
- a controller configured to:
  - selectively control at least one of the first switch or the second switch to manage a load in one of the first auxiliary low voltage bus or the second auxiliary low voltage bus based at least in part on the battery; and
  - selectively control at least one of an output voltage or an output current of at least one of a first grid associated with the first auxiliary low voltage bus or a second grid associated with the second auxiliary low voltage bus, the at least one of an output voltage or the output current being based on a balancing condition expressed by the following equation:

$$v_B = \sqrt{(CP_A - CP_B) * CR_B + \frac{v_A^2}{\frac{CR_A}{CR_B}}}$$

where $v_A$ is an output voltage across a first grid associated with the first auxiliary low voltage bus, $v_B$ is an output voltage across a second grid associated with the second auxiliary low voltage bus, $CR_A$ is a resistance across the first grid, $CR_B$ is a resistance across the second grid, $CP_A$ is a power across the first grid, and $CP_B$ is a power across the second grid.

15. The system of claim 14, wherein the first switch and the second switch are solid state switches.

16. The system of claim 14, wherein the first switch and the second switch are unidirectional switches.

17. The system of claim 14, wherein the first switch and the second switch are bidirectional switches.

18. The system of claim 14, wherein selectively controlling comprises enabling load shedding in one of the first auxiliary low voltage bus or the second auxiliary low voltage bus based on which bus has the higher power consumption.

19. The system of claim 14, wherein the first grid provides the electric power for the first auxiliary low voltage bus at a first current level and the second grid provides the electric power for the second auxiliary low voltage bus at a second current level different from the first current level.

20. The system of claim 14, wherein selectively controlling comprises enabling load shedding for one of first auxiliary low voltage bus or the second auxiliary low voltage bus having a low average state.

* * * * *